(12) United States Patent
Jiang et al.

(10) Patent No.: US 12,356,396 B2
(45) Date of Patent: Jul. 8, 2025

(54) SIGNALING SOLUTION ON RELIABILITY ENHANCEMENT FOR UPLINK TRANSMISSION

(71) Applicant: ZTE CORPORATION, Guangdong (CN)

(72) Inventors: Chuangxin Jiang, Shenzhen (CN); Shujuan Zhang, Shenzhen (CN); Hao Wu, Shenzhen (CN); Zhaohua Lu, Shenzhen (CN); Bo Gao, Shenzhen (CN); Ke Yao, Shenzhen (CN); Yu Pan, Shenzhen (CN)

(73) Assignee: ZTE Corporation, Shenzhen (CN)

(*) Notice: Subject to any disclaimer, the term of this patent is extended or adjusted under 35 U.S.C. 154(b) by 407 days.

(21) Appl. No.: 17/870,006

(22) Filed: Jul. 21, 2022

(65) Prior Publication Data

US 2022/0361206 A1 Nov. 10, 2022

Related U.S. Application Data

(63) Continuation of application No. PCT/CN2020/103186, filed on Jul. 21, 2020.

(51) Int. Cl.
*H04W 72/1268* (2023.01)
*H04L 1/08* (2006.01)
*H04W 72/23* (2023.01)

(52) U.S. Cl.
CPC .......... *H04W 72/1268* (2013.01); *H04L 1/08* (2013.01); *H04W 72/23* (2023.01)

(58) Field of Classification Search
CPC . H04W 72/1268; H04W 72/23; H04W 72/21; H04L 1/08; H04L 5/0051; H04L 5/0055; H04L 5/0057; H04L 5/0094; H04L 1/0026; H04L 1/1861
See application file for complete search history.

(56) References Cited

U.S. PATENT DOCUMENTS

| 2017/0086217 | A1  | 3/2017  | Zhu et al. |
| 2018/0176940 | A1  | 6/2018  | Xu et al. |
| 2019/0215095 | A1* | 7/2019  | Park .................. H04W 72/0453 |
| 2019/0357244 | A1* | 11/2019 | Takeda .................. H04W 72/23 |

(Continued)

FOREIGN PATENT DOCUMENTS

| CN | 1917411 A    | 2/2007 |
| CN | 108200649 A  | 6/2018 |

(Continued)

OTHER PUBLICATIONS

Apple Inc., "On Further MIMO Enhancement" 3GPP TSG RAN WG1 #100b, R1-2004234, May 25, 2020, e-Meeting (10 pages).

(Continued)

*Primary Examiner* — Thai Nguyen
(74) *Attorney, Agent, or Firm* — Foley & Lardner LLP

(57) ABSTRACT

Presented are systems and methods for enhancing the reliability of uplink transmissions. A wireless communication device may receive a scheduling grant of an uplink channel from a wireless communication node. The wireless communication device may transmit the uplink channel to the wireless communication node. The wireless communication device may transmit a transmission block indication for determining a transmission block size (TBS) of the uplink channel to the wireless communication node.

20 Claims, 7 Drawing Sheets

(56) References Cited

U.S. PATENT DOCUMENTS

| | | | |
|---|---|---|---|
| 2020/0068546 A1 | 2/2020 | Wu et al. | |
| 2022/0070938 A1* | 3/2022 | Wu | H04L 5/0055 |
| 2022/0173867 A1* | 6/2022 | Nogami | H04L 5/001 |

FOREIGN PATENT DOCUMENTS

| | | | |
|---|---|---|---|
| CN | 109586878 A | 4/2019 | |
| WO | WO-2018/090302 A1 | 5/2018 | |
| WO | WO-2020149660 A1 * | 7/2020 | H04L 1/0013 |

OTHER PUBLICATIONS

Catt, "Discussion on PDCCH monitoring reduction" 3GPP TSG RAN WG1 Meeting #101, R1-2003645, May 25, 2020, e-Meeting (3 pages).

Catt, "Discussion on the method for coverage enhancement" 3GPP TSG RAN WG1 #101, R1-2003651, May 25, 2020, e-Meeting (3 pages).

Ericsson, "Focus areas for Release-17 feMIMO" 3GPP TSG-RAN WG1 Meeting #99, R1-1912658, Nov. 18, 2019, Reno, USA (11 pages).

International Search Report and Written Opinion for PCT Appl. No. PCT/CN2020/103186 mailed Mar. 30, 2021 (9 pages).

Mediatek Inc., "Discussion on coverage recovery for NR RedCap UEs" 3GPP TSG RAN WG1 Meeting #101-e, R1-2003689, May 25, 2020, e-Meeting (5 pages).

Nokia et al., "Procedure of cross-slot scheduling power saving techniques" 3GPP TSG RAN WG1 meeting #100bis, R1-20022192, Apr. 20, 2020, e-Meeting (13 pages).

Nokia et al., "Procedure of cross-slot scheduling power saving techniques" 3GPP TSG RAN WG1 meeting #100e, R1-2001049, Feb. 24, 2020, e-Meeting (13 pages).

Nokia et al., "Procedure of cross-slot scheduling power saving techniques" 3GPP TSG RAN WG1 meeting #101s, R1-2004578, May 25, 2020, e-Meeting (10 pages).

Oppo, "PDCCH enhancement for URLLC" 3GPP TSG RAN WG1 #100-E, R1-2000479, Feb. 24, 2020, Athens, Greece (17 pages).

Qualcomm Incorporated, "PDCCH Enhancements for eURLLC" 3GPP TSG-RAN WG1 #99, R1-1912959, Nov. 18, 2019, Reno, Nevada, USA (11 pages).

Samsung, "Summary of email Discussion for Rel.17 enhancements on MIMO for NR" 3GPP TSG RAN Meeting #86, RP-192435, Dec. 9, 2019, Sitges, Spain (31 pages).

Sierra Wireless: "LTE-M Multiple Transport Block Grant Design Considerations" 3GPP TSG RAN WG1 #99; R1-1912369; Nov. 22, 2019; Reno, USA (11 pages).

Vivo et al., "Discussion on functionality for coverage recovery" 3GPP TSG-RAN WG1 Meeting #101, R1-2003433, May 25, 2020, e-Meeting (7 pages).

ZTE, "Further details on multi-beam/TRP operation" 3GPP TSG RAN WG1 Meeting #99, R1-1911933, Nov. 18, 2019, Reno, US (10 pages).

First Office Action for CN Appl. No. 202080104557.3, dated Sep. 4, 2024 (with English translation, 18 pages).

Extended European Search Report for EP Appl. No. 20945991.6, dated Nov. 8, 2022 (12 pages).

Huawei et al., "Coexistence between configured grant and dynamic grant in NR-U" 3GPP TSG-RAN WG2 Meeting #105, R2-1901335, Mar. 1, 2019, Athens, Greece (6 pages).

Huawei et al., "Early data transmission in RACH for NB-Iot" 3GPP TSG RAN WG1 Meeting #92bis, R1-1803871, Apr. 20, 2018, Sanya, China (6 pages).

* cited by examiner

SIGNALING SOLUTION ON RELIABILITY ENHANCEMENT FOR UPLINK TRANSMISSION

CROSS-REFERENCE TO RELATED APPLICATION

This application claims the benefit of priority under 35 U.S.C. § 120 as a continuation of PCT Patent Application No. PCT/CN2020/103186, filed on Jul. 21, 2020, the disclosure of which is incorporated herein by reference in its entirety.

TECHNICAL FIELD

The disclosure relates generally to wireless communications, including but not limited to systems and methods for enhancing the reliability of uplink transmissions.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). In a wireless communication system (e.g., a 5G NR wireless communication system), a blockage may prevent, affect, and/or impact the transmission and/or exchange of indicators, messages, data and/or information. Therefore, the blockage may affect and/or impact the reliability of uplink/downlink transmissions.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may receive a scheduling grant of an uplink channel from a wireless communication node. The wireless communication device may transmit the uplink channel to the wireless communication node. The wireless communication device may transmit a transmission block indication to the wireless communication node. The transmission block indication may be used for determining a transmission block size (TBS) of the uplink channel.

In some embodiments, the scheduling grant may comprise downlink control information (DCI) or a higher layer configuration to schedule the uplink channel. In some embodiments, the transmission block indication may indicate whether the TBS of the uplink channel is determined according to information of the scheduling grant. In some embodiments, the transmission block indication may indicate whether the TBS of the uplink channel is determined according to information of a grant associated with the scheduling grant. In some embodiments, the wireless communication device may use the scheduling grant and the grant associated with the scheduling grant, to schedule repetitive transmissions of the uplink channel, or to schedule repetitive transmissions of a same data block.

In some embodiments, the scheduling grant and the grant associated with the scheduling grant, may be configured, activated or indicated with independent transmission configuration indicator (TCI) states. In some embodiments, the scheduling grant and the grant associated with the scheduling grant, may be from different control resource sets (CORESETs), or may be associated with different values of coresetPoolIndex-r16 parameter. In some embodiments, the scheduling grant and the grant associated with the scheduling grant, may indicate a same hybrid automatic repeat request (HARD) processing number or identifier, or a same new number indicator (NDI). In some embodiments, the wireless communication device may receive a higher layer configuration. In some embodiments, the wireless communication device may transmit the transmission block indication in the uplink channel to the wireless communication node, according to the higher layer configuration. In some embodiments, the higher layer configuration may be configured on a per CORESET basis, a per search space (SS) basis or a per CORESET pool basis.

In some embodiments, the wireless communication device may transmit the transmission block indication to the wireless communication node indication if an uplink shared channel (UL-SCH) indicator has a value of 1. In some embodiments, the wireless communication device may transmit the transmission block indication in the uplink channel using at least one of the procedures of uplink control information (UCI) on a physical uplink shared channel (PUSCH). The procedures of UCI on a PUSCH may comprise code block segmentation, cyclic redundancy check (CRC) attachment, channel coding, rate matching, code block concatenation, or multiplexing of coded UCI bits to the PUSCH, wherein the UCI includes at least one of hybrid automatic repeat request acknowledgement (HARQ-ACK), channel state information (CSI) part 1, or CSI part 2.

In some embodiments, offset values defined for the wireless communication device to determine a number of resources for multiplexing uplink control information (UCI) in the uplink channel may be used to determine a number of resources for multiplexing the transmission block indication in the uplink channel. In some embodiments, offset values defined for the wireless communication device to determine a number of resources for multiplexing the transmission block indication information in the uplink channel may be configured via higher layer configuration or indicated by the scheduling grant. In some embodiments, one or more bits of the transmission block indication may be arranged adjacent to an uplink control information (UCI) bit sequence. In some embodiments, one or more coded bits for the transmission block indication may be arranged adjacent to coded bits for uplink control information (UCI).

In some embodiments, a frequency hop of the uplink channel, modulated resource elements (REs) for the transmission block indication may be mapped after a first symbol that carries a demodulation reference signal (DMRS). In some embodiments, a frequency hop of the uplink channel, modulated resource elements (REs) for the transmission block indication may be mapped starting from a first symbol of the uplink channel which does not carry a DMRS.

At least one aspect is directed to a system, method, apparatus, or a computer-readable medium. A wireless communication node may transmit a scheduling grant of an uplink channel to a wireless communication device. The wireless communication node may receive the uplink channel from the wireless communication device. The wireless communication node may receive a transmission block indication for determining a transmission block size (TBS) of the uplink channel from the wireless communication device.

In some embodiments, the scheduling grant may comprise downlink control information (DCI) or a higher layer configuration to schedule the uplink channel. In some embodiments, the transmission block indication may indicate whether the TBS of the uplink channel is determined according to information of the scheduling grant. In some embodiments, the transmission block indication may indicate whether the TBS of the uplink channel is determined according to information of a grant associated with the scheduling grant. In some embodiments, scheduling repetitive transmissions of the uplink channel or scheduling repetitive transmissions of a same data block may comprise using the scheduling grant and the grant associated with the scheduling grant.

In some embodiments, the scheduling grant and the grant associated with the scheduling grant, may be configured, activated or indicated with independent transmission configuration indicator (TCI) states. In some embodiments, the scheduling grant and the grant associated with the scheduling grant, may be from different control resource sets (CORESETs), or may be associated with different values of coresetPoolIndex-r16 parameter. In some embodiments, the scheduling grant and the grant associated with the scheduling grant, may indicate a same hybrid automatic repeat request (HARD) processing number or identifier, or a same new number indicator (NDI). In some embodiments, the wireless communication node may transmit a higher layer configuration. In some embodiments, the wireless communication node may receive the transmission block indication in the uplink channel from the wireless communication device, according to the higher layer configuration. In some embodiments, the higher layer configuration may be configured on a per CORESET basis, a per search space (SS) basis or a per CORESET pool basis.

In some embodiments, the wireless communication node may receive the transmission block indication from the wireless communication device if an uplink shared channel (UL-SCH) indicator has a value of 1. In some embodiments, the wireless communication node may receive the transmission block indication in the uplink channel using at least one of the procedures of uplink control information (UCI) on a physical uplink shared channel (PUSCH). The procedures of UCI on a PUSCH may comprise code block segmentation, cyclic redundancy check (CRC) attachment, channel coding, rate matching, code block concatenation, or multiplexing of coded UCI bits to the PUSCH, wherein the UCI includes at least one of hybrid automatic repeat request acknowledgement (HARQ-ACK), channel state information (CSI) part 1, or CSI part 2.

In some embodiments, offset values defined for the wireless communication device to determine a number of resources for multiplexing uplink control information (UCI) in the uplink channel may be used to determine a number of resources for multiplexing the transmission block indication in the uplink channel. In some embodiments, offset values defined for the wireless communication device to determine a number of resources for multiplexing the transmission block indication information in the uplink channel may be configured via higher layer configuration or indicated by the scheduling grant. In some embodiments, one or more bits of the transmission block indication may be arranged adjacent to an uplink control information (UCI) bit sequence. In some embodiments, one or more coded bits for the transmission block indication may be arranged adjacent to coded bits for uplink control information (UCI).

In some embodiments, a frequency hop of the uplink channel, modulated resource elements (REs) for the transmission block indication may be mapped after a first symbol that carries a demodulation reference signal (DMRS). In some embodiments, a frequency hop of the uplink channel, modulated resource elements (REs) for the transmission block indication may be mapped starting from a first symbol of the uplink channel which does not carry a DMRS.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Figure 1:
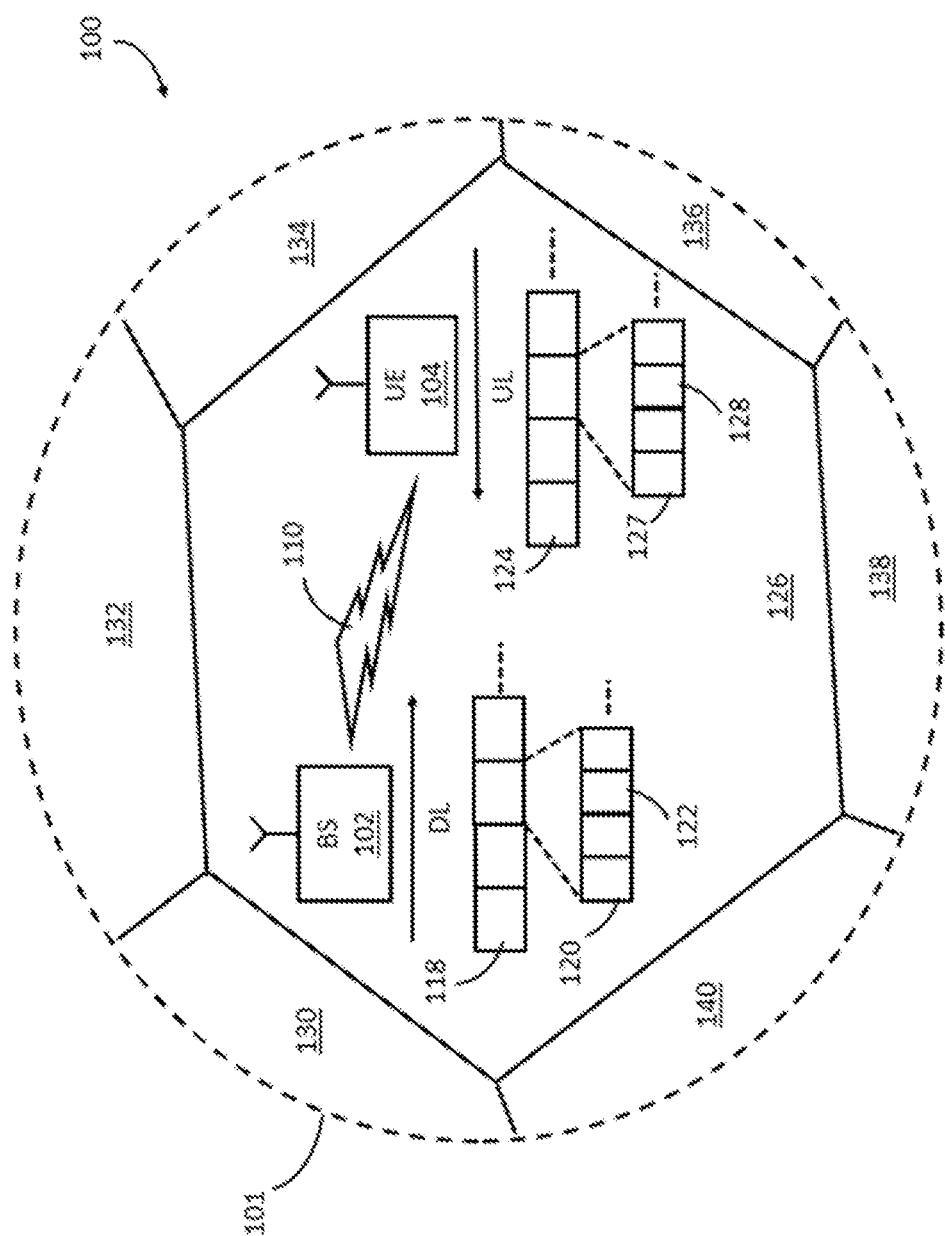
FIG. 1 illustrates an example cellular communication network in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise. The following acronyms are used throughout the present disclosure:

| Acronym | Full Name |
|---|---|
| 3GPP | 3rd Generation Partnership Project |
| 5G | 5th Generation Mobile Networks |
| 5G-AN | 5G Access Network |
| 5G gNB | Next Generation NodeB |
| 5G-GUTI 5G- | Globally Unique Temporary UE Identify |
| AF | Application Function |
| AMF | Access and Mobility Management Function |
| AN | Access Network |
| ARP | Allocation and Retention Priority |
| CA | Carrier Aggregation |
| CM | Connected Mode |
| CMR | Channel Measurement Resource |
| CSI | Channel State Information |
| CQI | Channel Quality Indicator |
| CSI-RS | Channel State Information Reference Signal |
| CRI | CSI-RS Resource Indicator |
| CSS | Common Search Space |
| DAI | Downlink Assignment Index |
| DCI | Downlink Control Information |
| DL | Down Link or Downlink |
| DN | Data Network |
| DNN | Data Network Name |
| ETSI | European Telecommunications Standards Institute |
| FR | Frequency range |
| GBR | Guaranteed Bit Rate |
| GFBR | Guaranteed Flow Bit Rate |
| HARQ | Hybrid Automatic Repeat Request |
| MAC-CE | Medium Access Control (MAC) Control Element (CE) |
| MCS | Modulation and Coding Scheme |
| MBR | Maximum Bit Rate |
| MFBR | Maximum Flow Bit Rate |
| NAS | Non-Access Stratum |
| NF | Network Function |
| NG-RAN | Next Generation Node Radio Access Node |
| NR | New radio |
| NZP | Non-Zero Power |
| OFDM | Orthogonal Frequency-Division Multiplexing |
| OFDMA | Orthogonal Frequency-Division Multiple Access |
| PCF | Policy Control Function |
| PDCCH | Physical Downlink Control Channel |
| PDSCH | Physical Downlink Shared Channel |
| PDU | Packet Data Unit |
| PUCCH | Physical uplink control channel |
| PMI | Precoding Matrix Indicator |
| PPCH | Physical Broadcast Channel |
| PRI | PUCCH resource indicator |
| QoS | Quality of Service |
| RAN | Radio Access Network |
| RAN CP | Radio Access Network Control Plane |
| RAT | Radio Access Technology |
| RBG | Resource Block Group |
| RRC | Radio Resource Control |
| RV | Redundant Version |
| SM NAS | Session Management Non Access Stratum |
| SMF | Session Management Function |
| SRS | Sounding Reference Signal |
| SS | Synchronization Signal |
| SSB | SS/PBCH Block |
| TB | Transport Block |
| TC | Transmission Configuration |
| TCI | Transmission Configuration Indicator |
| TRP | Transmission/Reception Point |
| UCI | Uplink Control Information |
| UDM | Unified Data Management |
| UDR | Unified Data Repository |
| UE | User Equipment |
| UL | Up Link or Uplink |
| UPF | User Plane Function |
| USS | UE Specific Search Space |

1. Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
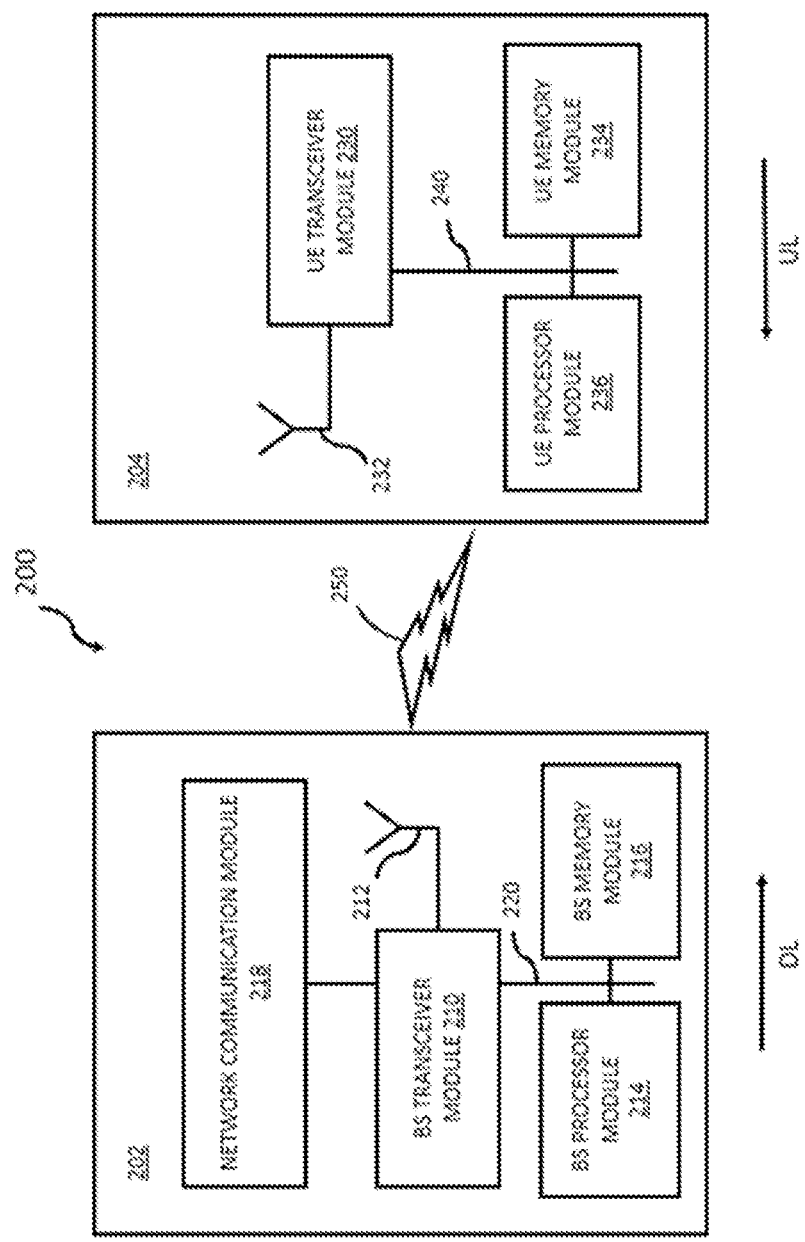
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Enhancing Reliability of Uplink Transmissions

In a wireless communication system, two or more scheduling grants of an uplink channel (e.g., downlink control information (DCI), higher layer configurations, and/or other information) may trigger, cause and/or prompt the transmission of two or more uplink channels (e.g., physical uplink shared channel (PUSCH) and/or other uplink channels). For example, two DCIs may trigger/cause/prompt the transmission of two respective PUSCHs. The two or more uplink channels may carry and/or include a corresponding/same data block and/or separate/distinct data blocks. If two or more scheduling grants cause the transmission/scheduling of a same data block, the uplink channels may carry/include the same data block using a same data block size. A wireless communication node (e.g., a ground terminal, a base station, a gNB, an eNB, a transmit-receive point (TRP), or a serving node) may receive and/or obtain the same data block to perform soft combining (or any other method that combines or integrates data from multiple transmissions to minimize/avoid incomplete information and/or error). If two or more scheduling grants cause the transmission/scheduling of separate/distinct data blocks, the uplink channels may carry/include the separate/distinct data blocks using separate/distinct data block sizes.

In some embodiments, a wireless communication device (e.g., a UE, a terminal, or a served node) may receive/obtain at least one (but less than the full amount) of two or more scheduling grants sent/transmitted by the wireless communication node. For example, a blockage (e.g., blockage by a physical entity, signal interference, and/or other sources of blockage) may cause the wireless communication device to receive one of two DCIs transmitted by the wireless communication node. In some embodiments, the wireless communication node may receive/obtain at least one (but less than the full amount) of two or more uplink channels sent/transmitted by the wireless communication device. For example, a blockage may cause the wireless communication node to receive one of two PUSCHs transmitted by the wireless communication device.

The wireless communication node and the wireless communication device may extract, obtain, determine, and/or share the size of the data block(s). The wireless communication device may send, transmit, provide and/or broadcast a transmission block indication of the uplink channel to the wireless communication node. The transmission block indication of the uplink channel may inform and/or provide information of the size of the data block(s). For example, the wireless communication device may inform the wireless communication node via the transmission block indication if the size of the data block(s) of the uplink channel (e.g., PUSCH) is determined/specified/indicated by information of the scheduling grant (e.g., the scheduling DCI). The scheduling grant may be used to schedule the uplink channel. In another example, the wireless communication device may inform the wireless communication node via the transmission block indication if the size of the data block(s) of the uplink channel (e.g., PUSCH) is determined/specified/indicated by information of (not the scheduling grant itself, but) a grant associated with the scheduling grant.

If the size of the data block(s) is determined/specified/indicated by the scheduling grant, a first uplink channel (e.g., a first PUSCH carrying a data block) may be distinct/independent from a second uplink channel (e.g., a second PUSCH carrying a separate data block). The first and/or second uplink channels may use separate/distinct data block sizes to include/carry the data block(s). If the size of the data block(s) is determined/specified/indicated by the grant associated with the scheduling grant, the first uplink channel (e.g., the first PUSCH carrying a data block) may carry and/or include the same data block(s) as the second uplink channel (e.g., the second PUSCH carrying the same data block). The grant associated with the scheduling grant may be used to schedule the second uplink channel. The first and/or second uplink channels may use corresponding/equal data block sizes to include/carry the data block(s).

Figure 3:
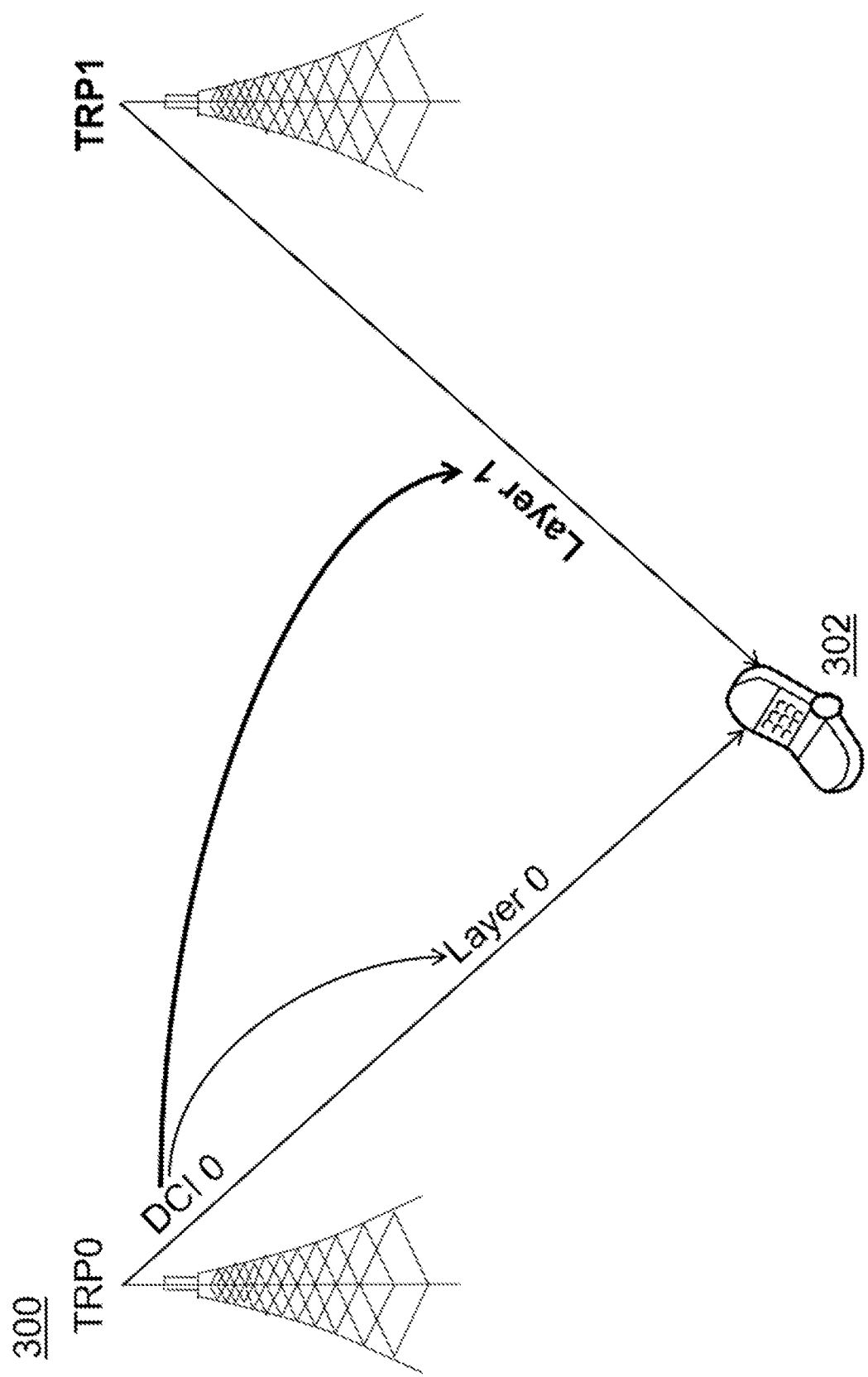
FIGS. 3-5 illustrate various approaches for transmitting downlink data utilizing multiple transmit-receive points (MTRP) and one or more scheduling grants, in accordance with some embodiments of the present disclosure.

Referring now to FIG. 3, depicted is a representation 300 of an example downlink transmission that utilizes multiple transmit-receive points (MTRP) and a single scheduling grant (e.g., DCI). Certain systems can support transmissions that use a single DCI and MTRP. In single DCI-based MTRP transmission(s), the wireless communication node(s) may schedule one or more downlink channel transmissions (e.g., physical downlink shared channel (PDSCH) transmissions and/or other downlink channel transmissions) using one scheduling grant (e.g., DCI, radio resource control (RRC) signaling, and/or other indicators). For example, a PDSCH transmission from TRP0 and/or a PDSCH transmission from TRP1 may be scheduled using DCI0. Either one of the one or more transmit-receive points (TRPs) may send/transmit/broadcast the scheduling grant (e.g., DCI, RRC signaling, and/or other grants). For example, TRP1 or TRP0 may send/transmit DCI0 to a wireless communication device. In some embodiments, two or more TRPs may send/transmit via one or more layers to the wireless communication device (e.g., UE 302) at a given time. For example, TRP0 and TRP1 may send/transmit via Layer 0 and Layer 1 respectively to a UE 302. In the case of ideal backhaul between two or more TRPs (e.g., TRP0 and TRP1), a single scheduling grant (e.g., DCI0 or another indicator) may provide and/or indicate information to schedule a downlink channel (e.g., a PDSCH via one or more layers from two TRPs) transmission. The downlink channel transmissions from the TRPs may use at least two layers (e.g., Layer 0, Layer, 1, and/or other layers). The at least two layers may be spatially multiplexed in the same physical time and/or frequency resources (e.g., the at least two layers may utilize a spatial division multiplexing (SDM) scheme).

Figure 4:
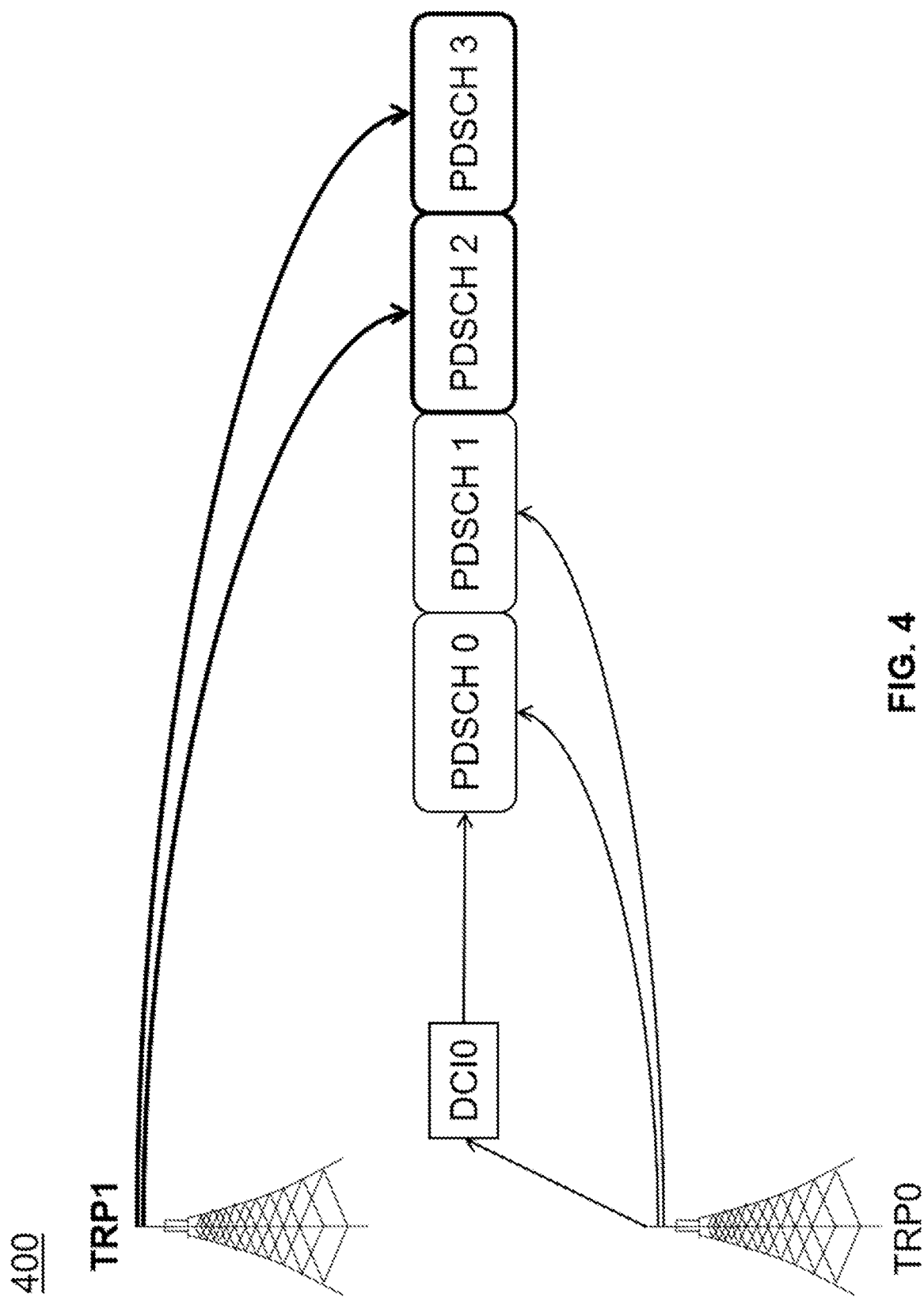

Referring now to FIG. 4, depicted is a representation 400 of an example downlink transmission utilizing MTRP and a single scheduling grant (e.g., DCI). In some embodiments, one or more TRPs may send/transmit/broadcast one or more downlink channels (e.g., PDSCH or other downlink channels) to a wireless communication device (e.g., a UE 302) using a time division multiplexing (TDM) scheme. For example TRP0 and/or TRP1 may transmit/send one or more PDSCHs (e.g., PDSCH0, PDSCH1, PDSCH2, PDSCH3 and/or other PDSCHs) to a UE 302 using TDM. In some embodiments, one or more downlink channels may include/carry (e.g., transport, communicate, convey) the same data block and/or information. For example, PDSCH0 and PDSCH1 may include/carry the same data block and/or information. In another example, PDSCH2 and PDSCH3 may include/carry the same data block and/or information. The downlink channels (e.g., PDSCHs) that include/carry the same data block may be referred to as repetition occasions or repetitive transmissions. The scheduling grant (e.g., DCI0) may provide/specify information to schedule the downlink transmission(s) (e.g., PDSCH0, PDSCH1, PDSCH2, and/or PDSCH3) from the one or more TRPs (e.g., TRP0 and/or TRP1). Either one of the one or more TRPs may generate/transmit/provide the scheduling grant (e.g., DCI, RRC signaling, and/or other indicators). For example, TRP0 or TRP1 may generate/send/transmit DCI0. The wireless communication node(s) may save/reduce DCI related (e.g., transmission, processing) overhead and/or improve/increase transmission reliability for PDSCH transmissions by using a single DCI.

The carrier frequencies of frequency range 2 (FR2) may exceed the carrier frequencies of other frequency ranges. For example, the carrier frequencies of FR2 may exceed the carrier frequencies of frequency range 1 (FR1) or other frequency ranges. In some embodiments, blockage may occur in FR 2 (or other frequency ranges). If blockage occurs, the blockage may affect/impact/impede the transmission(s) from one or more TRPs. For example, the blockage may affect/impact/impede the PDSCH (e.g., PDSCH0, PDSCH1, PDSCH2, and/or PDSCH3) transmissions from TRP0 and/or TRP1. If the blockage affects/interrupts/impacts the transmission(s) from one TRP, the wireless communication device may still receive/obtain/detect the complete transmission(s) from another TRP (e.g., a TRP that is not affected by blockage). For example, if the blockage affects the transmission(s) from TRP0, the wireless communication device may receive the complete transmission(s) from TRP1 (e.g., the transmissions are repetition occasions). Therefore, using MTRP may enhance/improve the robustness of downlink channel transmissions (e.g., PDSCH transmissions) in FR2 (or other frequency ranges).

In some embodiments, the blockage may interrupt/affect the single scheduling grant (e.g., DCI) transmission from the wireless communication node (e.g., TRP). If the scheduling grant transmission is blocked, the wireless communication device may be unable to receive/obtain/decode the downlink channel transmission. For example, if the DCI0 transmission from TRP0 is blocked, the UE 302 may be unable to receive/decode the PDSCH0 and/or PDSCH1 transmissions. The DCI (or other scheduling grant) may include/provide scheduling information of the PDSCH, such as time/frequency resource location, modulation and coding scheme (MCS), and/or other information. The wireless communication device/node may use the information provided/indicated/specified by the DCI for the downlink channel (e.g., PDSCH) transmission.

Figure 5:
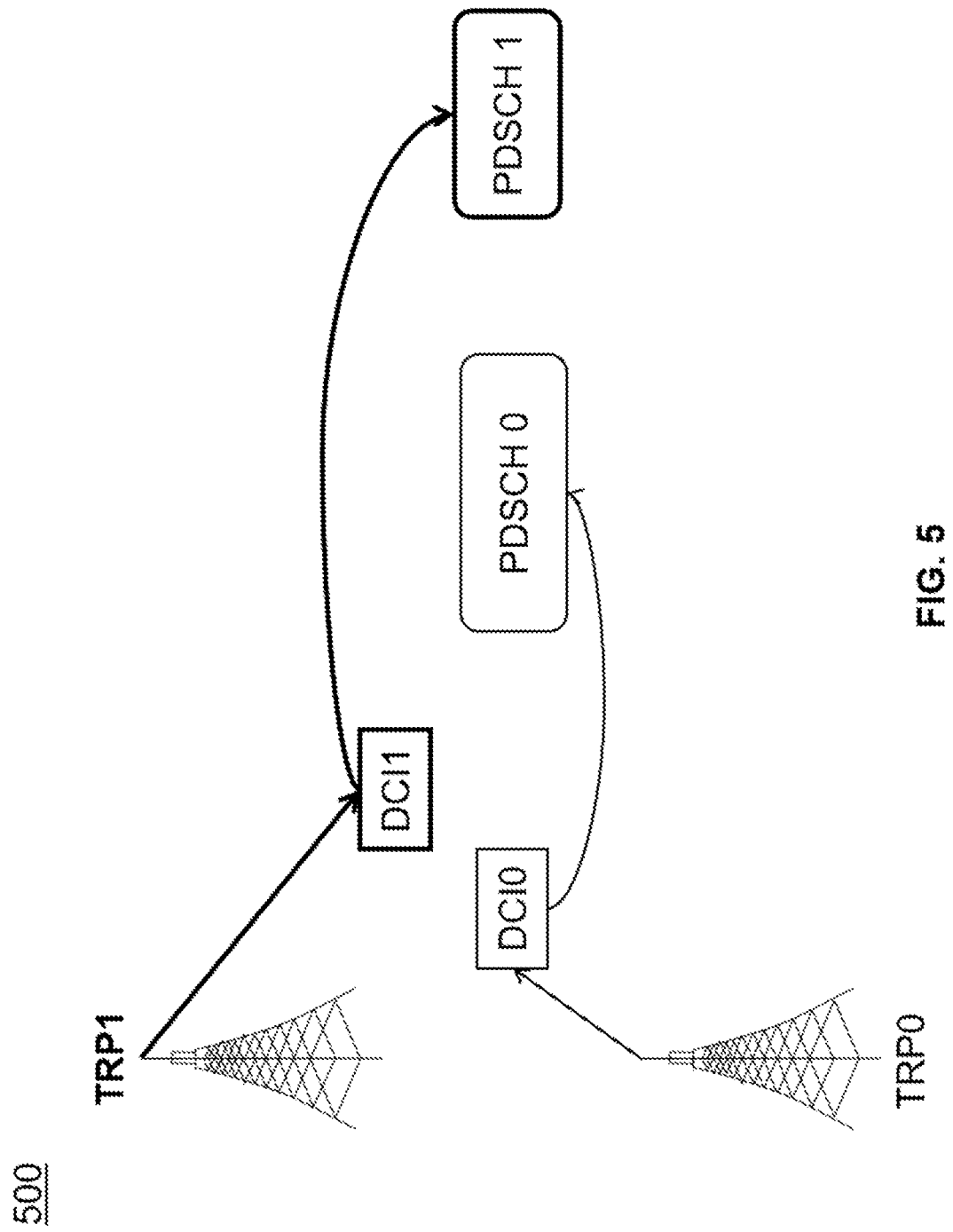

Referring now to FIG. 5, depicted is a representation 500 of an example downlink transmission that utilizes MTRP and two or more scheduling grants (e.g. two or more DCIs). Multiple DCI-based MTRP transmissions can be used to address scheduling grant transmission blockages. In some embodiments, two or more wireless communication nodes (e.g., TRPs) may transmit/send at least one scheduling grant each. For example, TRP0 and TRP1 may each send/transmit a DCI (e.g., DCI0 and DCI1 respectively). The scheduling grants (e.g., DCI0 and/or DCI1) may provide/specify information to schedule the downlink channel transmissions. For example, DCI0 and DCI1 may provide/specify information to schedule PDSCH0 and PDSCH1 respectively. The scheduling grant(s) transmissions from the two or more TRPs may provide/specify information to schedule separate/distinct downlink channel (e.g., PDSCH) transmissions. For example, DCI0 may provide/specify information to schedule PDSCH0, which may be separate/distinct from PDSCH1. One or more values of the RRC parameter coresetPoolIndex-r16 (e.g., corresponding to a CORESET pool index, or other parameters) may be used to configure/determine the scheduling grants (e.g., the DCIs). In some embodiments, one or more values of coresetPoolIndex-r16 may indicate/correspond to a particular TRP.

Using MTRP and a plurality of scheduling grants may enhance/improve the reliability of downlink channel transmissions (e.g., PDSCH transmissions) in FR2 (or other frequency ranges). However, certain systems may fail to provide similar enhancements/improvements for uplink channel (e.g., PUSCH or other uplink channels) transmissions. The transmission power of uplink channel transmissions may be less than the transmission power of downlink channel transmissions. Therefore, it may be difficult to ensure uplink coverage and/or reliability. The systems and methods presented herein include a novel approach to improve and/or increase the reliability of uplink channel transmissions via redundancy/duplication, by at least 25% (e.g., 35, 45 or other percent) for example.

In some embodiments, transmissions that utilize MTRP and a single scheduling grant (e.g., DCI) may improve the reliability of uplink data transmissions. For example, the wireless communication device(s) may transmit two or more PUSCH repetitions using TDM and a single DCI (or other scheduling grant). In FR2, the use of analog beams may achieve beamforming gain and/or compensate the large pathloss. The narrow bandwidth of the analog beams may cause the analog beams to be highly vulnerable to blockage by an entity (e.g., human bodies). If the beam bandwidth is narrow, utilizing a single DCI and MTRP may be an ineffective approach. However, the wireless communication device may send/transmit/broadcast one or more uplink channels (e.g., PUSCHs) to one or more wireless communication nodes (e.g., TRPs). For example, the wireless communication device may use one or more analog beams to transmit one or more PUSCHs via one or more beam directions. In some embodiments, the wireless communication node may send/transmit a single scheduling grant (e.g., DCI) using a single beam. If the single beam is blocked, the wireless communication device may be unable to receive/obtain the scheduling grant. As a result, the wireless communication device may be unable to transmit the intended repetitions (e.g., PUSCH repetitions).

Figure 6:
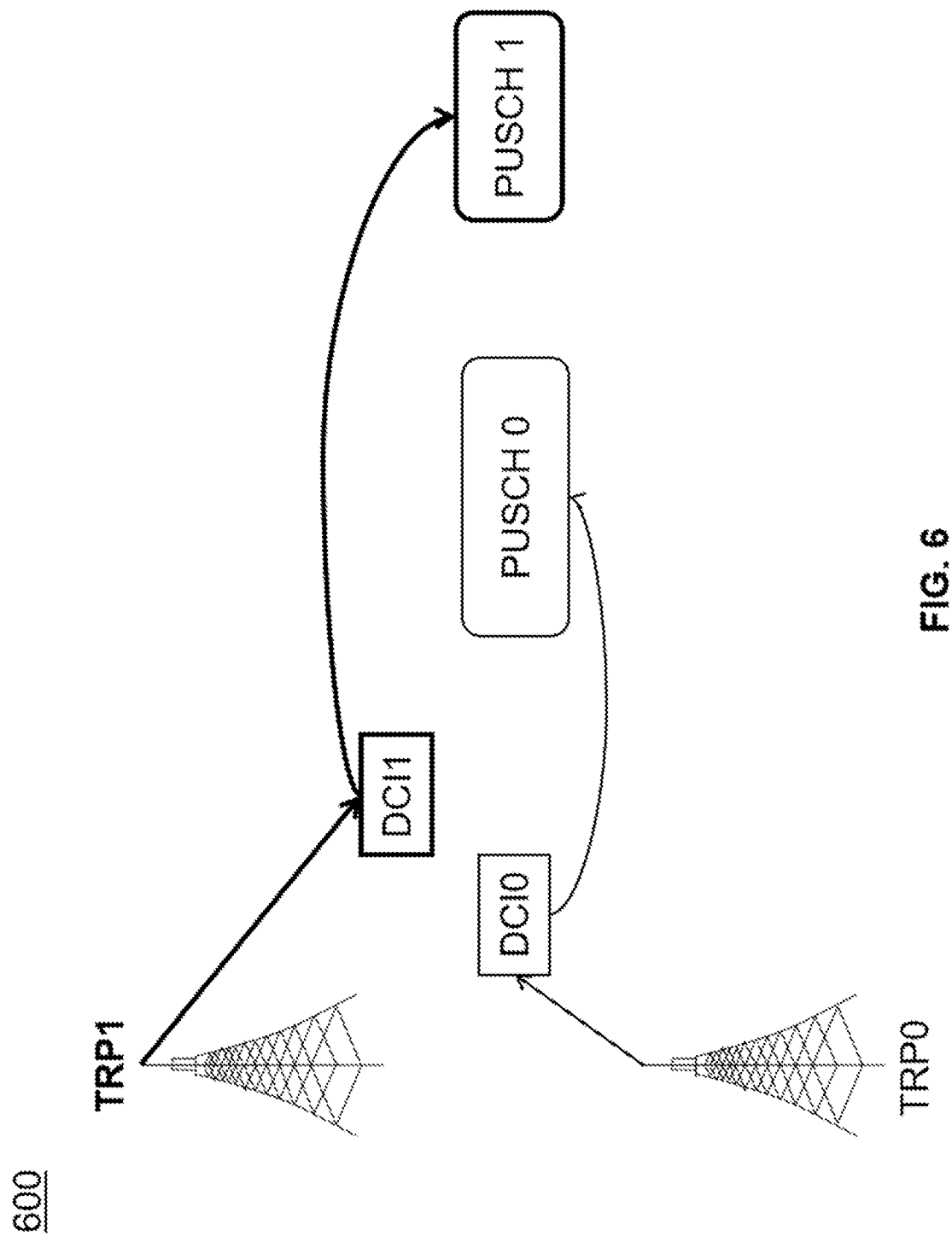
FIG. 6 illustrates example approaches for transmitting uplink data utilizing MTRP and two or more scheduling grants, in accordance with some embodiments of the present disclosure.

Referring now to FIG. 6 depicted is a representation 600 of an example uplink transmission that utilizes MTRP and two or more scheduling grants (e.g. two or more DCIs). Two or more uplink channel transmissions (e.g., PUSCH transmissions) may carry/include the same data block to improve and/or increase the reliability of uplink channel transmissions via redundancy/duplication. For example, PUSCH0 and PUSCH1 may carry/include the same data block to improve the reliability via redundancy/repetition.

The wireless communication node may receive/obtain the uplink channel transmissions and perform soft combining on the received transmissions. Therefore, the two or more uplink channel transmissions (e.g., PUSCH0 and PUSCH1) may carry a same data block with equal/corresponding transmission block size (TBS). For example, PUSCH0 and PUSCH1 may carry/include a data block with equal/corresponding TBS. The wireless communication node may receive/obtain the transmissions and perform soft combining on PUSCH0 and PUSCH1. The scheduling grant (e.g., the scheduling DCI and/or higher layer configuration) may specify/provide/indicate scheduling information (e.g., the amount of time resources, the amount of frequency resources, the MCS, and/or other information). In some embodiments, the scheduling information may be used to determine the TBS. The wireless communication node may determine/identify/configure the TBS of an uplink channel transmission by using the scheduling information provided by the corresponding scheduling grant (e.g., the corresponding DCI and/or higher layer configuration). For example, the wireless communication node may determine the TBS of PUSCH0 by using the scheduling information provided by DCI0. In another example, the wireless communication node may determine the TBS of PUSCH1 by using the scheduling information provided by DCI1.

Two or more scheduling grants (e.g., DCI) may include/indicate/provide distinct and/or different scheduling information. For example, DCI0 may include/indicate scheduling information that is distinct from the scheduling information provided by DCI1. If the scheduling information of the scheduling grants is distinct/separate, the TBS of the uplink channel transmissions may be distinct/different. For example, DCI0 and DCI1 may specify/indicate separate scheduling information. Therefore, the TBS of PUSCH0 and the TBS of PUSCH1 may be distinct/different as specified by the corresponding scheduling grant (e.g., DCI0 and DCI1 respectively). In order to ensure an equal/corresponding TBS between two or more uplink channel transmissions, the scheduling grant corresponding to a first uplink transmission may be used to transmit/send a second (or other) uplink transmission. For example, the wireless communication device may utilize the scheduling grant corresponding to PUSCH0 (e.g., DCI0) to determine/configure the TBS of PUSCH1. In another example, the wireless communication device may utilize DCI1 to determine/configure the TBS of PUSCH0. In this example, the wireless communication device may utilize the corresponding scheduling grant of the uplink transmission (e.g., PUSCH0) to determine other types of scheduling information (e.g., frequency resource allocation, antenna port indication and/or other types of information). For example, the wireless communication device may utilize DCI1 to determine the TBS of PUSCH0 and DCI0 to determine the antenna port indication.

In some embodiments, the wireless communication device may receive/obtain at least one (but less than the full amount) of two or more scheduling grants sent/transmitted by the wireless communication node (e.g., due to blockage). The wireless communication node may configure/activate/indicate the scheduling grants using independent/separate analog beams. A single analog beam may correspond to a transmission configuration indicator (TCI) state, a quasi-co-location (QCL) configuration set, a spatial relation information, and/or a sounding reference signal (SRS) indicator (SRI). In some embodiments, the wireless communication node may receive/obtain at least one (but less than the full amount) of two or more uplink transmissions from the wireless communication device (e.g., due to blockage). The wireless communication node and/or the wireless communication device may be unable to predict/anticipate the blockage (e.g., the blockage occurs randomly).

In some embodiments, the wireless communication node may send/transmit at least one (but less than the full amount) of two or more scheduling grants (e.g., DCI and/or higher layer configuration) to improve flexibility and/or capability. In some embodiments, one or more uplink channel transmissions may carry/include separate data blocks with separate transmission block sizes. For example, PUSCH1 and PUSCH0 may carry/include distinct data blocks with separate transmission block sizes (e.g., the PUSCH transmissions may represent/correspond to separate/distinct transmissions).

In some embodiments, one or more uplink channel transmissions may include/carry the same data block (e.g., the transmissions may have a corresponding/equal TBS). Two or more scheduling grants may be associated if they are used to schedule two or more uplink transmissions carrying/including the same data block. For example, DCI0 and DCI1 may be associated if they are used to schedule two PUSCHs that carry/include the same data block. The wireless communication node may inform/indicate/specify to the wireless communication device that two or more scheduling grants (e.g., DCI and/or higher layer configuration) are associated/linked. For example, TRP0 and/or TRP1 may provide information to the UE 302 that indicates DCI0 and DCI1 are associated.

The wireless communication node may provide/specify the association information via an indicator, a scheduling grant, a message, a transmission, and/or other methods. For example, the wireless communication node may send/transmit two or more DCIs (e.g., DCI0 and DCI1) that carry/include a same/associated hybrid automatic repeat request (HARQ) processing number (or other indicator/number). Higher layer signaling (or other types of signaling) may configure and/or predetermine whether two or more HARQ processing numbers are associated. The wireless communication device may receive/obtain the two or more DCIs (or other scheduling grants) and may determine whether the corresponding HARQ numbers (or other indicators/numbers) are the same/associated. For example, UE 302 may receive DCI0 and DCI1, each including/carrying a HARQ processing number. The UE 302 may determine whether the HARQ number of DCI0 and the HARQ number of DCI1 are the same/associated. If the HARQ numbers are the same/associated, the wireless communication device may determine the two or more uplink transmissions (e.g., PUSCH0 and PUSCH1) that are scheduled with the DCIs are repetitive transmissions. Therefore, the wireless communication device may determine that the DCIs (e.g., DCI0 and DCI1) are associated. If the HARQ numbers are distinct/unequal, the wireless communication device may determine that the two or more uplink transmissions (e.g., PUSCH0 and PUSCH1) are distinct/independent (e.g., the DCIs are unassociated).

In some embodiments, the scheduling grants may be associated with distinct/separate control resource sets (CORESETs) and/or coresetPoolIndex-r16 (or other higher layer signaling parameters). The coresetPoolIndex-r16 may indicate/specify/provide the index of the CORESET pool. Two or more scheduling grants associated with separate CORESETs and/or coresetPoolIndex-r16 may include/indicate/specify the same HARQ processing number (e.g., the two or more scheduling grants may be associated). For example, DCI1 and DCI0 may carry/include the same HARQ processing number and each be associated with a separate CORESET. Therefore, DCI1 and DCI0 may be associated/linked (e.g., the DCIs carry/include the same HARQ number). In some embodiments, a new number indicator (NDI) may provide information indicating/specifying whether two or more scheduling grants are associated. For example, two DCIs (or other scheduling grants) that carry/include/specify the same NDI may be associated.

In some embodiments, misalignment/miscommunication may occur between the wireless communication node and the wireless communication device. The embodiments discussed herein are non-limiting examples that describe alignment and/or misalignment cases.

Case 1: The wireless communication node may transmit/send two or more scheduling grants to schedule two or more repetitive uplink transmissions (e.g., repetition occasions). The wireless communication device may receive/obtain the two or more scheduling grants.

The wireless communication device may transmit/send/broadcast two or more uplink transmissions using the same TBS. The wireless communication device may utilize one of the two or more scheduling grants to determine/configure the TBS. For example, the wireless communication device may transmit PUSCH0 and PUSCH1 using the same TBS. The wireless communication device may utilize DCI0 (or DCI1) to determine the TBS.

The wireless communication node may receive/obtain/detect the uplink transmissions. The wireless communication node may determine the TBS is configured based on the information provided by one of the two or more scheduling grants.

Case 2: The wireless communication node may transmit/send a single scheduling grant to schedule a single uplink transmission. In some embodiments, the wireless communication node may transmit/send two or more scheduling grants to schedule independent/distinct/separate uplink channel transmissions.

The wireless communication device may transmit/send one or more uplink transmissions using the corresponding scheduling grant. The wireless communication device may determine the TBS of a particular uplink channel transmission based on the corresponding scheduling grant of the particular uplink channel transmission.

The wireless communication node may receive/obtain/detect the one or more uplink transmissions. The corresponding scheduling grant may indicate/specify the TBS of the one or more uplink transmissions.

Case 3: The wireless communication node may send/transmit two or more scheduling grants for scheduling two or more repetitive transmissions (e.g., repetition occasions). The wireless communication device may receive/obtain at least one (but less than the full amount) of the two or more scheduling grants due to blockage. In some embodiments, the wireless communication device may receive/obtain one of the two or more scheduling grants.

The wireless communication device may receive/obtain at least one (but less than the full amount) of the two or more scheduling grants. Therefore, the wireless communication device may determine/assume that Case 2 is occurring. The wireless communication device may transmit/send at least one (but less than the full amount) uplink transmission. The wireless communication device may determine the TBS of the at least one uplink transmissions using the corresponding scheduling grant. For example, the wireless communication device may transmit PUSCH1 using the TBS indicated/specified by DCI1.

In some embodiments, the wireless communication node may determine/assume that Case 1 is occurring. Therefore, the wireless communication node may receive/obtain the at least one uplink transmission under the assumption that the TBS was determined using a grant associated with the corresponding scheduling grant. For example, the wireless communication node may receive PUSCH1 under the assumption that the TBS was determined using DCI0. The wireless communication node may fail to receive PUSCH0, therefore determining that PUSCH0 was blocked. Misalignment may occur between the wireless communication node and the wireless communication device.

In some embodiments, the wireless communication device may send/transmit a transmission block (TB) indication to the wireless communication node to determine information (e.g., TBS) of a scheduled uplink data transmission. The wireless communication device may report/indicate whether the TBS of the uplink transmission is determined by using the corresponding scheduling grant. In some embodiments, the wireless communication device may report/indicate whether the TBS of the uplink transmission is determined by using a grant associated with the scheduling grant (e.g., a grant associated with the scheduling grant). For example, the UE 302 may report/indicate whether the TBS of PUSCH0 is determined by using the scheduling information of the corresponding scheduling DCI (e.g., DCI0). In another example, the UE 302 may report/indicate whether the TBS of PUSCH0 is determined by using the scheduling information of the grant associated with the scheduling grant (e.g., DCI1).

In some embodiments, the wireless communication device may transmit/send/report/convey/communicate a TB indication. The TB indication may report/specify/indicate whether the TBS of the uplink channel transmission is determined by using the scheduling information of the scheduling grant (e.g., DCI, higher layer configuration, or other grants). The TB indication may report/specify/indicate whether the TBS of the uplink channel transmission is determined by using the scheduling information of a grant associated with the scheduling grant. The association between the scheduling grant and the grant(s) associated with the scheduling grant may indicate that the grants can schedule repetitive transmissions of a same data block. The uplink transmissions that are scheduled using the associated grants may be repetitive transmissions (e.g., repetition occasions).

The scheduling grant and the grant associated with the scheduling grant may be from different CORESETs and/or be associated with different values of coresetPoolIndex-r16 (or CORESET pool). A beam (e.g., corresponding to a TCI state and/or spatial relation information) may be configured on a per CORESET basis. Therefore, the scheduling grant and the grant associated with the scheduling grant may be from different CORESETs (or be associated with different values of coresetPoolIndex-r16) to achieve beam diversity gain. In some embodiments, the scheduling grant and the grant associated with the scheduling grant may be from separate TRPs.

In some embodiments, the TB indication may specify whether the TBS of an uplink transmission is determined by using the scheduling grant or the grant associated with the scheduling grant. For example, the TB indication may specify/indicate that the TBS is determined by using the scheduling information of the scheduling grant. In another example, the TB indication may specify/indicate that the TBS is determined by using the scheduling information of the grant associated with the scheduling grant. If the TBS is determined by using the scheduling grant (e.g., the scheduling DCI), the uplink channel transmission may be independent/distinct from other uplink transmissions. For example, PUSCH0 may be independent/distinct from PUSCH1 if the TBS of PUSCH0 is determined/configured by using DCI0. In this example, the wireless communication device may schedule PUSCH1 by using the scheduling information of DCI1.

If the TBS is determined by using the grant associated with the scheduling grant (e.g., an associated DCI), the uplink channel transmission may be a repetitive transmission (e.g., repetition occasion) of another uplink channel transmission. For example, PUSCH0 and PUSCH1 may be repetitive transmissions if the TBS of both PUSCHs is determined/configured by using DCI1 for instance. The wireless communication device may determine the TBS of the repetitive transmission by using a grant associated with the scheduling grant. The TBS of the repetitive transmissions may be the same. If the uplink transmissions are repetitive transmissions, the scheduling grant and the grant associated with the scheduling grant may be associated/linked. The associated grants of the repetitive transmissions may include/carry/specify a same/corresponding/associated HARQ processing number/identification (or other indicator). The associated grants may be from separate/different CORESETs and/or associated with separate/different values of coresetPoolIndex-r16. In some embodiments, the associated grants may include/carry/specify a same/corresponding/associated NDI. In some embodiments, the associated grants may include/carry/specify a same/corresponding/associated carrier indicator and/or bandwidth part indicator.

In some embodiments, the uplink channel transmission may carry, include, provide, and/or specify the TB indication. A higher layer configuration (e.g., RRC signaling, medium access control control elements (MAC CE) signaling, or other configurations/signaling) may determine/indicate whether the uplink transmission (e.g., PUSCH) includes the TB indication. The higher layer configuration may be configured per CORESET, search space (SS), and/or CORESET pool (e.g., per coresetPoolIndex-r16 and/or TRP). The wireless communication node may schedule the uplink transmission using a scheduling grant (e.g., DCI) associated with the CORESET, SS, or TRP. The uplink channel transmission may carry/include the TB indicator to report/specify/indicate whether the uplink channel transmission is a repetitive transmission. For instance, if a PUSCH is scheduled by a DCI associated with a CORESET, a SS, or a TRP that is configured with a TB indication, the PUSCH may carry/include the TB indication. The PUSCH may carry the TB indication to indicate/specify that the TBS of the PUSCH is based on the scheduling DCI or the DCI associated with the scheduling DCI. If a PUSCH is scheduled by a DCI associated with a CORESET, a SS, or a TRP that is not configured with the TB indication, the indicator may be excluded from the PUSCH. The TBS of the PUSCH may be based on the scheduling DCI, rather than on another DCI. In some embodiments, higher layer signaling may comprise RRC signaling or MACCE signaling.

The wireless communication node and/or device may utilize the TB indicator to determine/specify the TBS. Therefore, the wireless communication device may transmit/send the TB indicator only if the uplink shared channel indicator (UL-SCH) of the scheduling grant (e.g., DCI) has a value of one. The TB indication may be used to determine the data block size. Therefore, the TB indication can exist only if the UL-SCH (uplink shared channel and/or UL data) indicator in the DCI has a value of one. The UL-SCH may comprise one or more bits. If the UL-SCH has a value of one, the uplink channel transmission may include/indicate/specify the UL-SCH. If the UL-SCH has a value of zero, the uplink channel transmission may exclude the UL-SCH.

The DCI may be used to schedule an uplink channel transmission (e.g., PUSCH). In some embodiments, a RRC configuration (or RRC signal) may determine, indicate and/or specify the scheduling of semi-persistent uplink channel transmissions (e.g., semi-persistent PUSCH occasions). Therefore, the systems and methods disclosed herein may be utilized for PUSCH transmissions that are scheduled using RRC configuration. In some embodiments, the RRC configuration may replace/substitute the DCI. Independent/separate beams may configure, activate, and/or indicate the PUSCHs transmissions that are scheduled using at least two grants (e.g., DCI and/or RRC configuration).

A. Mapping the TB Indicator to the Uplink Channel Transmission

The wireless communication node may receive/obtain the TB indication from the wireless communication device. The wireless communication node may decode the received TB indication to determine the TBS of the uplink channel. The wireless communication device may utilize the information provided by the decoded TB indication to decode the uplink channel. In some embodiments, the uplink channel may carry/include the TB indication. The wireless communication device may send/transmit the TB indication of the uplink channel with UL-SCH using at least one of the procedures of uplink control information (UCI) transmissions. The UCI may comprise at least one of HARQ acknowledgement (HARQ-ACK), channel state information (CSI) part 1, and/or CSI part 2. In some embodiments, the wireless communication device may transmit the TB indication using at least one of code block segmentation, cyclic redundancy check (CRC) attachment, channel coding, rate matching, code block concatenation, and/or multiplexing of coded UCI bits to the PUSCH. The embodiments discussed herein are non-limiting examples that describe options or implementations for mapping the TB indication to the uplink channel (e.g., PUSCH).

Option 1: The wireless communication device may utilize the uplink channel to send/transmit the TB indication using HARQ-ACK multiplexing on the uplink channel with UL-SCH. The channel coding and/or resource element (RE) mapping may follow/imitate/adopt certain procedure(s) of HARQ-ACK.

Option 1-1: If the uplink channel (e.g., PUSCH) includes a HARQ-ACK, the HARQ-ACK bit(s) may include or correspond to the TB indication. In some embodiments, the offset values ($\beta_{offset}^{HARQ-ACK}$) may include or correspond to the TB indication. The wireless communication device may configure the offset values to determine a number of resources for multiplexing HARQ-ACK information in an uplink channel. For example, in a bit sequence $a_0$, $a_1$, $a_2$, $a_3$, ..., $a_{A-1}$, bit $a_0$ may include or correspond to the TB indication. In this example, bits $a_1$ through $a_{A-1}$ may include or correspond to the HARQ-ACK bits. In another example, bit $a_{A-1}$ may include or correspond to the TB indication while the remaining bits correspond to the HARQ-ACK bits. One or more bits of the bit sequence may include or correspond to the TB indication. Other bits in the bit sequence (e.g., $a_1$, $a_2$, and/or other bits) may include or correspond to the TB indication.

If the uplink channel with UL-SCH excludes the HARQ-ACK, the TB indicator may include or correspond to the HARQ-ACK bit(s). The offset values may be used for the TB indication transmission via the uplink channel with UL-SCH. The offset values ($\beta_{offset}^{HARQ-ACK}$) may be defined for a wireless communication device to determine a number of resources for multiplexing HARQ- ACK information in a PUSCH. The offset values ($\beta_{offset}^{HARQ-ACK}$) may be used for the TB indication.

Option 1-2: If the uplink channel (e.g., PUSCH) includes a HARQ-ACK, the TB indication may be mapped/placed/configured prior to or following (e.g., adjacent to, or abutting) the ACK/NACK bit(s). The wireless communication device may configure the offset values to determine a number of resources for multiplexing the TB indication information in the uplink channel. The higher layer configuration(s) (e.g., RRC signaling, MAC CE signaling, and/or other types of signaling) may determine/configure/define the offset values. The TB indication and the HARQ-ACK may be channel coded separately. For example, in a coded bits sequence $g_0\ g_1, \ldots, g_{G-2}\ g_{G-1}$, bits $g_0\ g_1$ may include or correspond to TB indication coded bits. In this example, the remaining bits correspond to the HARQ-ACK coded bits. In another example, bits $g_{G-2}\ g_{G-1}$ may include or correspond to the TB indication coded bits and the remaining bits correspond to the HARQ-ACK coded bits. One or more bits of the coded bits sequence may include or correspond to the TB indication coded bits.

If the uplink channel with UL-SCH excludes the HARQ-ACK, the RE mapping rule(s) may follow/imitate the RE mapping rules(s) of HARQ-ACK. Higher layer signaling (e.g., RRC, MACCE, and/or other signaling) may configure/define/determine the offset values. In some embodiments, the scheduling grant (e.g., DCI) may indicate/specify the offset values.

Modulated REs of the TB indication may be mapped/placed following a first symbol that carries/specifies a demodulation reference signal (DMRS). If intra-slot PUSCH hopping is enabled, in a frequency hop of the uplink channel, modulated resource elements (REs) for the transmission block indication may be mapped after a first symbol that carries aDMRS.

In some embodiments, HARQ-ACK can be replaced by CSI part1 and/or CSI part 2 in the above solutions.

Option 2: The wireless communication device may utilize the uplink channel to send/transmit the TB indication using CSI part 1 transmission procedures on the uplink channel with UL-SCH. The channel coding and/or RE mapping may follow/imitate the procedure(s) of CSI part 1.

Option 2-1: If the uplink channel (e.g., PUSCH) includes the CSI part 1, the CSI part 1 bit(s) may include or correspond to the TB indication. The TB indication may be mapped/linked prior to or following the CSI part 1 bit(s). The wireless communication device may configure the offset values ($\beta_{offset}^{CSI-1}$) to determine a number of resources for multiplexing CSI part 1 information in an uplink channel. The offset values may include or correspond to the TB indication.

Option 2-2: If the uplink channel (e.g., PUSCH) includes the CSI part 1, the TB indication may be mapped/placed/configured prior to or following the CSI part 1 bit(s). The higher layer configuration(s) (e.g., RRC signaling, MAC CE signaling, and/or other types of signaling) may determine/configure/define the offset values. In some embodiments, the scheduling grant (e.g., DCI) may indicate/specify the offset values.

Option 3: The wireless communication device may utilize the uplink channel to send/transmit the TB indication using CSI part 2 transmission procedures on the uplink channel with UL-SCH. The channel coding and/or RE mapping may follow/imitate/adopt certain procedure(s) of CSI part 2.

Option 3-1: If the uplink channel (e.g., PUSCH) includes the CSI part 2, the CSI part 2 bit(s) may include or correspond to the TB indication. The TB indication may be mapped/linked prior to or following the CSI part 2 bit(s). The wireless communication device may configure the offset values ($\beta_{offset}^{CSI-2}$) to determine a number of resources for multiplexing CSI part 2 information in an uplink channel. The offset values may include or correspond to the TB indication.

Option 3-2: If the uplink channel (e.g., PUSCH) includes the CSI part 2, the TB indication may be mapped/placed/configured prior to or following the CSI part 2 bit(s). The higher layer configuration(s) (e.g., RRC signaling, MAC CE signaling, and/or other types of signaling) may determine/configure/define the offset values. In some embodiments, the scheduling grant (e.g., DCI) may indicate/specify the offset values.

In some embodiments, the modulated REs of the TB indication may be mapped/placed starting from a first symbol of the uplink channel which does not carry a DMRS. If intra-slot PUSCH hopping is enabled, in a frequency hop of the uplink channel, modulated resource elements (REs) for the transmission block indication may be mapped starting from a first symbol of the uplink channel that excludes/omits a DMRS.

B. Methods of Enhancing the Reliability of Uplink Transmissions

Figure 7:
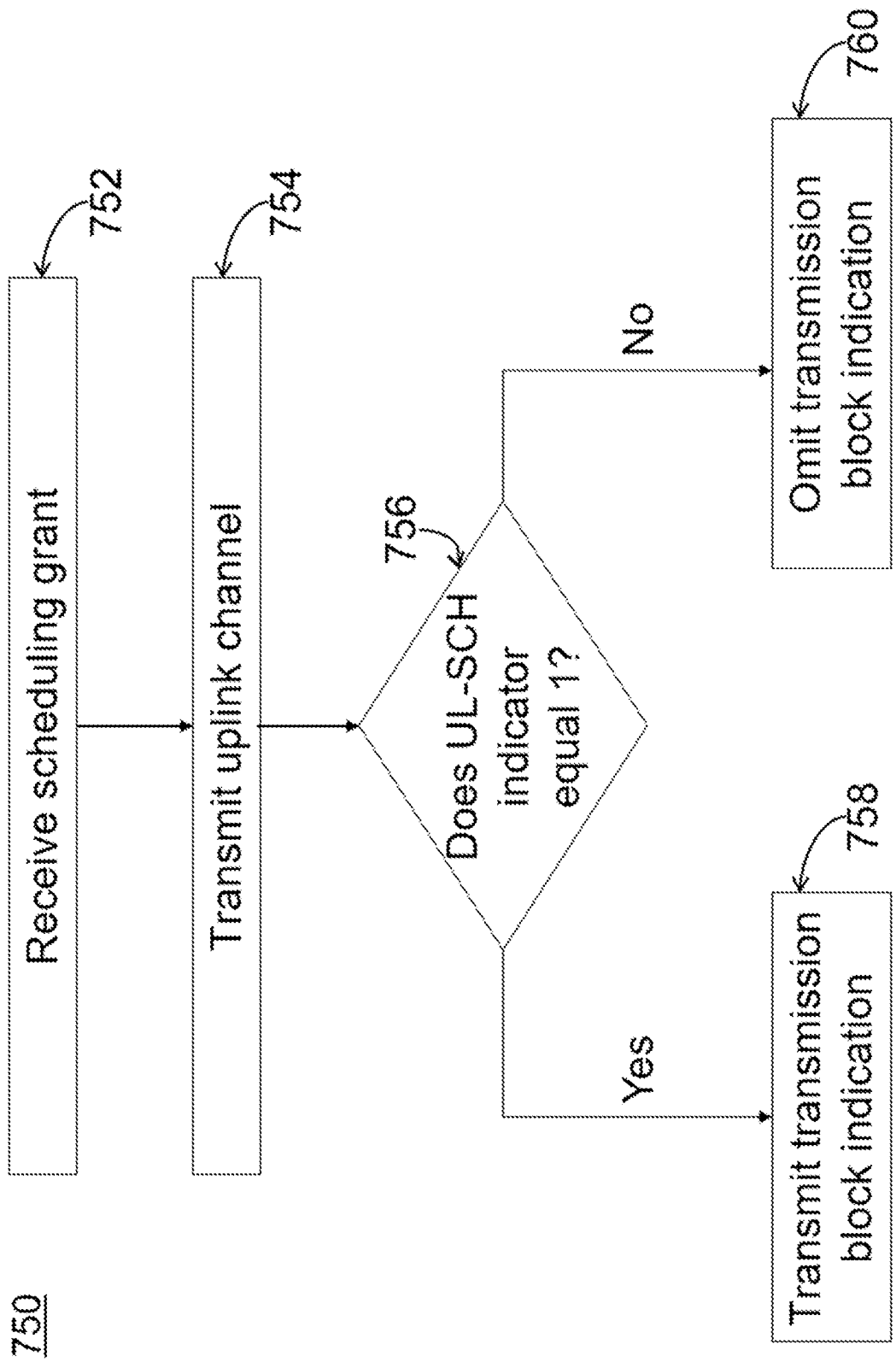
FIG. 7 illustrates a flow diagram of an example method of enhancing the reliability of uplink transmissions using one signaling solutions, in accordance with an embodiment of the present disclosure.

FIG. 7 illustrates a flow diagram of a method 750 of enhancing the reliability of uplink transmissions. The method 750 may be implemented using any of the components and devices detailed herein in conjunction with FIGS. 1-6. In overview, the method 750 may include receiving a scheduling grant (752). The method 750 may include transmitting an uplink channel (754). The method 750 may include determining whether the UL-SCH indicator has a value of one (756). The method 750 may include transmitting the transmission block indication (758). The method 750 may include omitting a transmission block indication (760).

Referring now to operation (752), and in some embodiments, a wireless communication device (e.g., a terminal node or a UE) may receive and/or obtain a scheduling grant from a wireless communication node (e.g., a base station or a gNB). The wireless communication node may generate/send/transmit/broadcast the scheduling grant to the wireless communication device. For example, the UE 302 may receive/obtain one or more scheduling grants from one or more TRPs (e.g., TRP0 and/or TRP1). The wireless communication node may send/transmit the scheduling grant using a downlink channel (e.g., PDCCH) and/or other types of channels. The scheduling grant may comprise downlink control information (DCI), a higher layer configuration, and/or other indicators/configurations to schedule the uplink channel. The higher layer configuration may comprise RRC signaling, MAC CE signaling, and/or other types of signaling. The scheduling grant may support the transmission of the uplink/downlink channels (e.g., DL-SCH, UL-SCH, and/or other channels). The scheduling grants may include/provide resource allocation information, modulation and coding scheme(s), transmit power information, HARQ number/indicator information, precoding information, and/or other types of information.

Referring now to operation (754), and in some embodiments, the wireless communication device may transmit and/or send an uplink channel to the wireless communication node. The uplink channel may comprise a physical uplink shared channel (PUSCH) or other types of uplink channels. The wireless communication node may receive/obtain the uplink channel from the wireless communication device. For example, a TRP may receive/obtain a PUSCH from the UE 302. In some embodiments, the wireless communication device may utilize the scheduling grant to configure the uplink channel transmission. For example, UE 302 may utilize information provided by DCI0 to configure the transmission of PUSCH0. The wireless communication device may utilize the TBS information indicated/provided by the scheduling grant to configure the uplink channel transmission. In some embodiments, the wireless communication device may send/transmit the uplink channel responsive to receiving the scheduling grant.

Referring now to operation (756), and in some embodiments, the wireless communication device may determine whether the UL-SCH indicator has a value of 1. The scheduling grant may comprise/include/specify/carry the UL-SCH indicator and/or other indicators. Prior to transmitting the TB indication, the wireless communication device may determine whether the UL-SCH indicator (or other indicators) has a value of 1. For example, the wireless communication device may receive the scheduling grant (e.g., DCI0) from the wireless communication node. Responsive to receiving the scheduling grant, the wireless communication device may determine whether the UL-SCH indicator included in the scheduling grant has a value of 1. If the UL-SCH indicator has a value of 1 (e.g., indicating that there is data for transmission), the wireless communication device may transmit/send the UL-SCH and/or TB indication using the uplink channel (e.g., PUSCH0). In another example, if the UL-SCH indicator has a value of 0, the wireless communication device may exclude/omit the UL-SCH and/or TB indication from the uplink transmission. Other values distinct from 0 or 1 may be used to indicate the inclusion or exclusion of the UL-SCH and/or TB indication from the uplink transmission. The TB indication may indicate/specify information of the TBS of the uplink channel transmission.

Referring now to operation (758), and in some embodiments, the wireless communication device may transmit/configure/generate the transmission block (TB) indication. The wireless communication device may transmit the TB indication responsive to determining that the UL-SCH indicator has a value of 1. For example, the wireless communication device may determine that the UL-SCH indicator included in the scheduling grant has a value of 1. Responsive to the determination, the wireless communication device may transmit the TB indication to the wireless communication node. Therefore, the wireless communication node may receive/obtain the TB indication from the wireless communication device. A value of 1 of the scheduling grant may indicate uplink data is available for transmission. The wireless communication device may transmit/send the TB indication and the uplink channel separately. For example, the wireless communication device may send/transmit the TB indication (e.g., via a message, transmission or signal) without using the PUSCH transmission.

Referring now to operation (760), and in some embodiments, the wireless communication device may omit/skip the transmission/configuration/generation of the TB indication. The wireless communication device may omit/bypass/skip the TB indication responsive to determining the UL-SCH indicator has a value distinct from 1. For example, the wireless communication device may determine that the UL-SCH indicator included in the scheduling grant has a value of 0. Responsive to the determination, the wireless communication device may omit/exclude (e.g., not incorporate) the TB indication from the uplink transmission to the wireless communication node. The wireless communication node may receive the uplink transmission without the TB indication. A value of 0 of the scheduling grant may indicate that uplink data is unavailable for transmission.

The TB indication may indicate/specify whether the TBS of the uplink channel is determined according to information of the scheduling grant and/or according to information of a grant associated with the scheduling grant. For example, the TB indication may indicate whether the TBS of PUSCH0 is determined according to DCI0 or DCI1. The information of the grants may comprise an amount of time resources, an amount of frequency resources, a modulation and coding scheme, and/or other information. The wireless communication device may use the scheduling grant and/or the grant associated with the scheduling grant to schedule repetitive transmissions of the uplink channel. The wireless communication device may use the scheduling grant and/or the grant associated with the scheduling grant to schedule repetitive transmissions of a same data block. For example, the wireless communication device may utilize either DCI0 or DCI1 to schedule repetitive transmissions of a PUSCH. The association between the grants may indicate/specify that two or more uplink transmissions are repetitive transmissions (e.g., uplink transmission have the same TBS). For example, if DCI1 and DCI0 are associated with each other, the association may indicate that PUSCH0 and PUSCH1 are repetitive transmissions.

In some embodiments, the wireless communication device may receive/obtain a higher layer configuration (e.g., RRC signaling, MAC CE signaling, and/or other type of signaling) to transmit the TB indication in the uplink channel. In some embodiments, the wireless communication device may utilize the higher layer configuration to determine whether the TB indication is included in the uplink channel. The wireless communication node may send/transmit the higher layer configuration to the wireless communication device. Therefore, the wireless communication node may configure/indicate/specify whether the TB indication is included in the uplink channel. The wireless communication device may transmit/send the TB indication according to the higher layer configuration. For example, RRC signaling may specify the TB indication is included in the uplink channel. Therefore, the wireless communication device may transmit/send the TB indication using the uplink channel. The wireless communication node may receive/obtain the TB indication according to the higher layer configuration. For example, the wireless communication node may transmit/send the higher layer configuration to the wireless communication device specifying the exclusion of the TB indication. Therefore, the wireless communication node may receive/obtain the uplink channel transmission without the TB indication. The higher layer configuration may be configured/determined on a per CORESET basis, a per SS basis, and/or a per CORESET pool basis.

The wireless communication device may transmit/send the TB indication in the uplink channel using (e.g., adopting, adapting) at least one of the procedures of UCI on PUSCH. The procedures may comprise code block segmentation, CRC attachment, channel coding, rate matching, code block concatenation, multiplexing of coded UCI bits to the PUSCH, and/or other procedures. The UCI may include/comprise at least one of HARQ-ACK, CSI part 1 or CSI part 2. In some embodiments, the wireless communication node may receive/obtain the TB indication in the uplink channel using at least one of the procedures of UCI on PUSCH. For example, the mechanism(s) of UCI code block segmentation, CRC attachment, channel coding, rate matching, code block concatenation, and/or multiplexing of coded UCI bits may be reused or adapted for the TB indication. In some embodiments, one or more bits of the TB indication may be arranged/placed/mapped adjacent to a UCI bit sequence. For example, the TB indication may be arranged prior to or following the UCI bit sequence. In some embodiments, the one or more coded bits of the TB indication may be arranged/placed/mapped adjacent to a UCI bit sequence. For example, the coded bits of the TB indication may be arranged prior to and/or following the UCI bit sequence. The coded bits of the TB indication may appear distinct, but can be arranged adjacent to the UCI bit sequence.

In some embodiments, the wireless communication node may configure/activate/indicate the scheduling grant and/or the grant associated with the scheduling grant with independent/separate/distinct TCI states. Therefore, the scheduling grant and/or the grant associated with the scheduling grant may be associated/linked to an independent TCI state. For example, a TRP may configure/activate/indicate DCI0 and/or DCI1 with independent TCI states. In some embodiments, a single analog beam may correspond to a single TCI state. The scheduling grant and/or the grant associated with the scheduling grant may be from different CORESETs. For example, DCI0 and DCI1 (associated with DCI0) may be from different CORESETs. The scheduling grant and/or the grant associated with the scheduling grant may be associated with different values of the coresetPoolIndex-r16 parameter. For example, two associated grants (e.g., DCI0 and DCI1) may be from different CORESETs and/or be associated with different values of the coresetPoolIndex-r16 parameter (or other parameters). In some embodiments, the scheduling grant and/or the grant associated with the scheduling grant may indicate/specify/include a same HARQ processing number/identifier or other numbers/identifiers. The scheduling grant and/or the grant associated with the scheduling grant may indicate/specify/include a same NDI and/or other indicators. For example, if two DCIs are associated, the DCIs may indicate/specify a same HARQ processing number and/or NDI (or other numbers/indicators). In some embodiments, two or more scheduling grants from separate/distinct CORESETs (or associated with different values of coresetPoolIndex-r16) may indicate/specify/include a same HARQ processing number, NDI, and/or other numbers/indicators.

In some embodiments, offset values may be defined for the wireless communication device. The offset values may be used to determine a number of resources for multiplexing the TB indication in the uplink channel. The offset values may be used to determine a number of resources for multiplexing UCI and/or TB indication information in the uplink channel. The offset values may be configured/determined via higher layer configuration (e.g., RRC signaling, MAC CE signaling, and/or other types of signaling). In some embodiments, the offset values may be indicated/specified by the scheduling grant (e.g., DCI). An uplink channel (e.g., PUSCH) may comprise/include two or more frequency hops. Each of the frequency hops may be scheduled via one or more frequency resources. A frequency hop of the uplink channel may comprise/include modulated resource elements (REs) for the TB indication. In some embodiments, modulated REs may be mapped/associated after a first symbol that carries a DMRS. In some embodiments, modulated REs may be mapped/associated starting from a first symbol of the uplink channel which does not carry a DMRS.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method, comprising:
receiving, by a wireless communication device from a wireless communication node, a scheduling grant of an uplink channel;
transmitting, by the wireless communication device to the wireless communication node, the uplink channel; and
transmitting, by the wireless communication device to the wireless communication node, a transmission block indication for determining a transmission block size (TBS) of the uplink channel, wherein the transmission block indication is indicative of whether the TBS of the uplink channel is determined according to information of the scheduling grant.

2. The method of claim 1, wherein the scheduling grant comprises downlink control information (DCI) or a higher layer configuration to schedule the uplink channel.

3. The method of claim 1, wherein the transmission block indication is indicative of whether the TBS of the uplink channel is determined according to information of a grant associated with the scheduling grant.

4. The method of claim 3, comprising using the scheduling grant and the grant associated with the scheduling grant, to schedule repetitive transmissions of the uplink channel, or to schedule repetitive transmissions of a same data block.

5. The method of claim 3, wherein the scheduling grant and the grant associated with the scheduling grant, are configured, activated or indicated with independent transmission configuration indicator (TCI) states.

6. The method of claim 3, wherein the scheduling grant and the grant associated with the scheduling grant, are from different control resource sets (CORESETs), or are associated with different values of coresetPoolIndex-r16 parameter.

7. The method of claim 3, wherein the scheduling grant and the grant associated with the scheduling grant, indicate a same hybrid automatic repeat request (HARQ) processing number or identifier, or a same new number indicator (NDI).

8. The method of claim 1, comprising:
receiving, by the wireless communication device, a higher layer configuration; and
transmitting, by the wireless communication device to the wireless communication node, the transmission block indication in the uplink channel, according to the higher layer configuration, wherein the higher layer configuration is configured on a per control resource set (CORESET) basis, a per search space (SS) basis or a per CORESET pool basis.

9. The method of claim 1, comprising transmitting, by the wireless communication device to the wireless communication node, the transmission block indication if an uplink shared channel (UL-SCH) indicator has a value of 1.

10. The method of claim 1, comprising transmitting the transmission block indication in the uplink channel using at least one of the following procedures of uplink control information (UCI) on a physical uplink shared channel (PUSCH): code block segmentation, cyclic redundancy check (CRC) attachment, channel coding, rate matching, code block concatenation, or multiplexing of coded UCI bits to the PUSCH, wherein the UCI includes at least one of hybrid automatic repeat request acknowledgement (HARQ-ACK), channel state information (CSI) part 1, or CSI part 2.

11. The method of claim 1, wherein offset values defined for the wireless communication device to determine a number of resources for multiplexing uplink control information (UCI) in the uplink channel are used to determine a number of resources for multiplexing the transmission block indication in the uplink channel.

12. The method of claim 1, wherein offset values defined for the wireless communication device to determine a number of resources for multiplexing the transmission block indication in the uplink channel are configured via higher layer configuration or indicated by the scheduling grant.

13. The method of claim 1, wherein one or more bits of the transmission block indication are arranged adjacent to an uplink control information (UCI) bit sequence.

14. The method of claim 1, wherein one or more coded bits for the transmission block indication are arranged adjacent to coded bits for uplink control information (UCI).

15. The method of claim 1, wherein in a frequency hop of the uplink channel, modulated resource elements (REs) for the transmission block indication are mapped after a first symbol that carries a demodulation reference signal (DMRS), or mapped starting from a first symbol of the uplink channel which does not carry a DMRS.

16. A method, comprising:
   transmitting, by a wireless communication node to a wireless communication device, a scheduling grant of an uplink channel;
   receiving, by the wireless communication node from the wireless communication device, the uplink channel; and
   receiving, by the wireless communication node from the wireless communication device, a transmission block indication for determining a transmission block size (TBS) of the uplink channel, wherein the transmission block indication is indicative of whether the TBS of the uplink channel is determined according to information of the scheduling grant.

17. The method of claim 16, wherein the scheduling grant comprises downlink control information (DCI) or a higher layer configuration to schedule the uplink channel.

18. The method of claim 16, wherein the transmission block indication is indicative of whether the TBS of the uplink channel is determined according to information of a grant associated with the scheduling grant.

19. A wireless communication device, comprising:
   at least one processor configured to:
      receive, via a transceiver from a wireless communication node, a scheduling grant of an uplink channel;
      transmit, via the transceiver to the wireless communication node, the uplink channel; and
      transmit, via the transceiver to the wireless communication node, a transmission block indication for determining a transmission block size (TBS) of the uplink channel, wherein the transmission block indication is indicative of whether the TBS of the uplink channel is determined according to information of the scheduling grant.

20. A wireless communication node, comprising:
   at least one processor configured to:
      transmit, via a transceiver to a wireless communication device, a scheduling grant of an uplink channel;
      receive, via the transceiver from the wireless communication device, the uplink channel; and
      receive, via the transceiver from the wireless communication device, a transmission block indication for determining a transmission block size (TBS) of the uplink channel, wherein the transmission block indication is indicative of whether the TBS of the uplink channel is determined according to information of the scheduling grant.

* * * * *